Dec. 2, 1969 P. J. DUKE 3,482,149

SINTERED GLASS INTEGRATED CIRCUIT STRUCTURE PRODUCT
AND METHOD OF MAKING THE SAME

Filed May 16, 1967

United States Patent Office 3,482,149

Patented Dec. 2, 1969

3,482,149

SINTERED GLASS INTEGRATED CIRCUIT STRUCTURE PRODUCT AND METHOD OF MAKING THE SAME

Philip J. Duke, New Boston, N.H., assignor to Sprague Electric Company, North Adams, Mass., a corporation of Massachusetts Filed May 16, 1967, Ser. No. 638,861
Int. Cl. C03b *19/06;* C03c *17/00*
U.S. Cl. 317—234 11 Claims

ABSTRACT OF THE DISCLOSURE

A very thin non-conducting disk is produced by sintering a layer of glass powder at a temperature below the fusing point between compressed blocks of finely divided refractory material, followed by cooling before removal of the blocks. A plurality of electric circuit components such as semiconductor chips can be incorporated in a disk by positioning them on a block and placing the glass powder over them, or by embedding them in the powder before the sintering step.

BACKGROUND OF THE INVENTION

This invention relates to thin non-conducting disks of glassy material and to such disks that are suitable for mounting circuit components especially for microelectronic circuits. This invention also relates to the method of making these disks.

Among the objects of the present invention is the provision of novel techniques for readily preparing thin glass disks that are substantially flat, as well as the provision of the disks themselves.

Additional objects of the present invention include the provision of glass disks that cary electric circuit components.

BRIEF DESCRIPTION OF THE DRAWING

The foregoing as well as additional objects of the present invention will be more fully understood from the following description of several of its exemplifications, reference being made to the accompanying drawings wherein.

SUMMARY OF THE INVENTION

According to the present invention a thin substantially flat glass disk is formed from glass powder layer by heat and pressure without melting the glass and without appreciably distorting it. The vitreous layer is very thin and can be successfuly produced with a thickness in the range of from about 10 to about 30 mils without cracking, curling or other distortion. The glass powder layer is placed between two compacted blocks of finely divided refractory material, each of which are in close continuous association with a surface of the glass powder layer.

This product is useful in providing a non-conducting substrate in which semiconductor bodies or other circuit components may be embedded, or on which they may be mounted.

Semiconductor chips may for example be first accurately positioned on a block and the glass powder poured over them, after which the compacting-sintering is effected to produce the disk with the chips sintered in place and one surface of each chip exposed.

DESCRIPTION OF PREFERRED EMBODIMENTS

Figure 1:
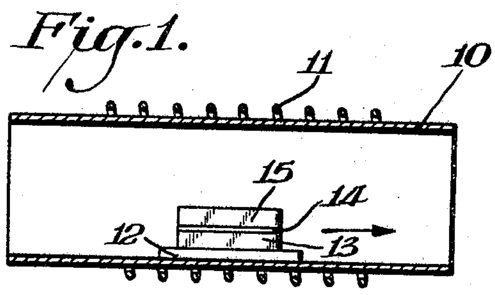
FIGURE 1 is a vertical sectional view of a firing arrangement for making the disks of the present invention.

Referring to FIGURE 1, a tube 10 is surrounded by an electrical heating winding 11 to suitably heat the tube. Within the tube a support 12 carries a first block 13. The block 13 according to this embodiment is made up of —240 mesh alumina powder which has been compacted under a pressure of 20,000 pounds per square inch. About 5% moisture by weight is added to the alumina powder first, before the compacting, to act as a binder and help hold the alumina particles together. This moisture evaporates on standing or heating without having the block crumble.

Distributed over the surface of block 13 is a very thin layer 14 of glass powder. This layer 14 is pressed in the same mold at the same pressure. A second block 15 similar to the first block 13 is pressed on the layer 14. The blocks 13 and 15 and the layer 14 are brought together so that there is close continuous association, otherwise characterizable as intimate contact, along the inner faces between the blocks 13 and 15 and the layer 14. The resulting sandwich arrangement can be assembled on the support 12 outside tube 10, and then inserted in the tube for firing.

The firing temperature is determined by the glass material and is below its melting point but above its sintering point. The sintering operation is completed about a half hour after the glass has reached its sintering temperature, and the assembly then permitted to cool at the rate of about 300° C. or less per hour until below annealing temperature. The cooled sandwich arrangement is removed from the tube and the upper block 15 removed from the sintered glass layer 14. The resultant solidified glass layer 14 is a very thin disk of the same radial dimension as the initial layer of glass powder.

It is a feature that the glass powder is compacted as much as the blocks are before the sintering. Here again a 5 weight percent addition of moisture to the glass powder before compacting serves as a binder and causes the compacted glass layer to become self-supporting so that it can be handled and readily placed on the lower block. Instead of moisture, methyl alcohol or suitable organic liquid can be used as binders for the alumina and glass layers.

Any kind of glass can be used in the foregoing process, including ordinary soda-lime glass, borosilicate glasses, optical glass (e.g. crown and flint glasses), lead glass, fluorite glass, fusing-in glasses, phosphate-containing glasses and high silica glasses. For example a glass having the following composition

| | Wt. percent |
|---|---|
| Silica ($SiO_2$) | 50.4 |
| Alumina ($Al_2O_3$) | 28.4 |
| Magnesia (MgO) | 11.2 |
| Zirconia ($ZrO_2$) | 10.0 |
| | 100.0 |

makes a very flat circular disk ¾ inch in diameter and 15 mils thick when a compacted —360 mesh powder disk 17 mils thick is fired at 1000° C. for 30 minutes, and the blocks 13, 15 are each of the order of ⅛ of an inch high. If the same treatment is applied without using upper block 15, the fired disk curls up into the shape of a cup upon cooling.

The disks of the present invention can be made of glasses such as alkali-free or low alkali glasses, fluoride-resistant glasses and even glasses considered unworkable because they devitrify if kept any length of time at or above their melting point.

The glass powder should have a particle size no larger than about one-third the thickness of the desired disk. Thus to produce a disk 30 mils thick the maximum particle size should be about 0.01 inch or about 60 mesh on any standard sieve scale. Finer particles are preferred, however, and if more than half the particles are larger than 100 mesh, the disk is apt to have a fairly rough surface.

The blocks 13, 15 can be made of other material that neither melts nor sinters at the firing temperature. Examples of such other materials include $TiO_2$, $ZrO_2$, $SiO_2$, $Cr_2O_3$, $Fe_2O_3$, SiC, MgO, and carbon. Carbon should be used in an inert atmosphere to keep from oxidizing it. It is important to attain an intimate contact at the interface between the non-sintering block and its respective surface of the glass layer. This intimate contact is considered valuable in maintaining the planar dimension without cracking, curling or distortion.

Figure 2:
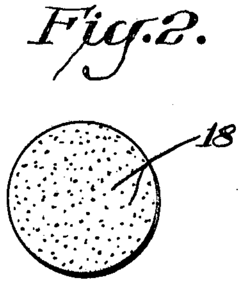
FIGURE 2 is a plan view of the final disk as removed from the firing apparatus.

When the fired glass disk is removed from between the blocks 13, 15 after cooling, some particles of these blocks are generally found adhering to the disk, as shown at 18 in FIGURE 2. These are readily removed by a scrubbing treatment or by a light lapping. The resulting disks make good capacitor dielectrics, for which purpose they can merely have both faces coated with electrically conductive layers such as vapor-deposited, sputtered or gas-plated aluminum, zinc or nickel or the like. Alternatively the disks can be physically clamped between capacitor electrodes.

Electrically conductive coatings on the disk can also be arranged to supply resistance and/or inductance in addition to or in place of the capacitance. Circuit components such as self-contained resistors, inductors and capacitors as well as diode and transistor chips can also be mounted on the disks as by means of epoxy or possibly solder.

Figure 3:
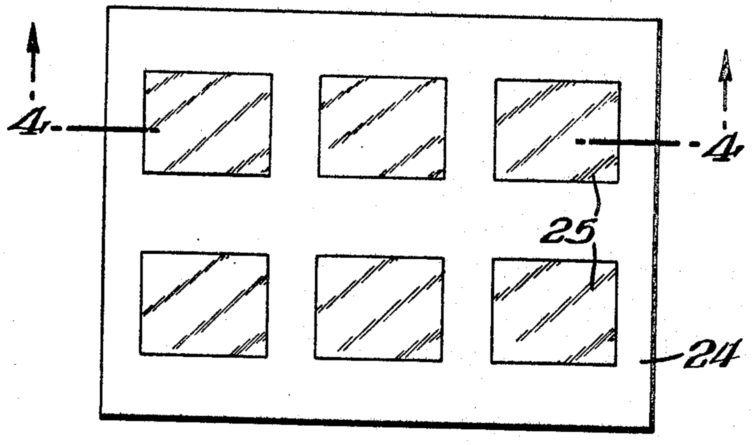
FIGURE 3 is a plan view of a disk containing circuit components in accordance with the present invention.
Figure 4:
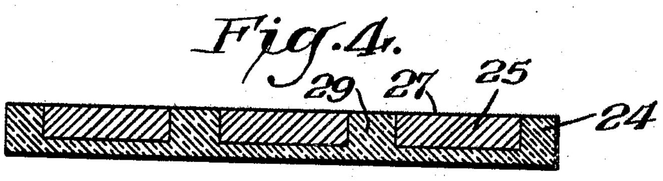
FIGURE 4 is a sectional view of the disk of FIGURE 3 taken along the line 4—4.

FIGURES 3 and 4 illustrate a modified disk 24 in which circuit components are embedded. This disk is shown rectangular in shape. Several monocrystalline silicon chips 25 are embedded and held by the sintering operation. The chips have flat surfaces 27 that are in the place of a disk surface 29. The remainder of each chip is completely enveloped by the glass and thus kept from electrical contact with other components, as well as from the surface-modifying electrical effects unprotected surfaces have on the operation of the chips when they are made into transistors or diodes.

The chips, or other devices, can be incorporated in the disks by first placing the chips in their desired locations on a support of a compacting press, pouring moistened glass powder over them, and then compacting the combination to produce a self-supporting disk as in FIGURE 4 but upside down—that is with the chips at the lower surface. The assembly can also be made by pressing the chips into the upper surface of a glass powder layer held securely in a compacting mold or on a firing block. The layer receiving the chips is such as to readily accept them. The chips may be incorporated in the glass layer by forming a mesa shaped silicon chip, depositing the layer of glass powder to entirely cover the mesa surface of the chip, sintering the glass layer with the silicon joined thereto and then lapping away the silicon from the side opposite to the glass powder and down to a surface which intersects both silicon and glass.

The circuit components embedded in the disk should withstand the firing treatment and the firing can even be of temperatures that cause the circuit components to sinter although this is not preferred. The firing treatment also lends itself to secondary use for modifying the circuit components. For instance the glass powder can contain phosphate or borate and during the firing silicon chips will become doped by diffusion of phosphorus or boron from these sources into the bodies of the chips. At the same time the block 13 or 15 contacting the faces 27 of the chips can also contain such doping agents so that separate *p* and *n* doping can be simultaneously effected.

After the embedding and final completion steps are carried out to make diodes or transistors from the chips, they are electrically connected to each other and/or to external terminals such as metallized zones on the chips or glass, for use in the final circuit. This makes a very convenient way to mount a plurality of semiconductor devices on a single support for miniaturized circuits.

1. A method for preparing a thin sintered glass plate that is substantially flat comprising: pressure-compacting finely divided refractory powder containing a binding proportion of a volatile binder, to form an at least self-supporting first block of said powder; pressure-compacting, to approximately the same degree, finely divided glass powder containing a binding proportion of a volatile binder, to form an at least self-supporting thin layer of said glass powder; forming an at least self-supporting second block of refractory powder like said first block; sandwiching said thin layer of glass powder between said first and second blocks; firing this combination at a temperature and for a time sufficient to attain an intimate contact at the interfaces between said thin layer and said blocks and to sinter the glass powder particles together so as to form a flat, coherent body, said sintering conditions being insufficient to sinter said refractory powder; cooling the sintered glass body to below thermal distortion temperature and removing said first and second blocks from said glass body.

2. The process of claim 1 wherein said glass powder is pressure-compacted against a face of said first block and said second block is formed by pressure-compacting refractory powder against a face of said thin layer of glass powder, so as to form a three layer composite.

3. The method of claim 1 wherein the sintered glass body is from 10–30 mils thick.

4. The method of claim 1 wherein the refractory powder is alumina.

5. The method of claim 1 wherein said glass powder is a devitrifiable glass.

6. The method of claim 1 in which electric circuit structure is embedded in the layer of glass powder prior to sintering said glass powder.

7. The method of claim 6 in which the embedded structure has at least one terminal portion on a face of said glass body.

8. The method of claim 7 in which the terminal portion is a surface of at least one semiconductor body.

9. A thin flat, sintered glass plate produced by the method of claim 1.

10. A flat, sintered glass plate about 10 to about 30 mils thick produced by the method of claim 8 so as to have a semiconductor chip embedded in it with a single surface of the chip exposed and coplanar with a surface of said plate.

11. A flat, sintered glass plate about 10 to 30 mils thick produced by the method of claim 8 so as to have a group of semiconductor chips embedded in it and spaced from each other, said chips having a single surface thereof exposed and coplanar with the surface of said plate.

References Cited

UNITED STATES PATENTS

| | | | |
|---|---|---|---|
| 3,293,077 | 12/1966 | Kaiser et al. | 65—18 |
| 3,383,760 | 5/1968 | Schwartzman | 65—32 |
| 2,960,419 | 11/1960 | Emeis | 317—234 |

S. LEON BASHORE, Primary Examiner

E. R. FREEDMAN, Assistant Examiner

U.S. Cl. X R.

29—588, 420, 420.5; 65—18, 32, 42, 43, 60; 317—235